May 18, 1965  O. W. KING  3,184,214
CAM OPERATED VALVE
Filed Jan. 18, 1962  3 Sheets-Sheet 2
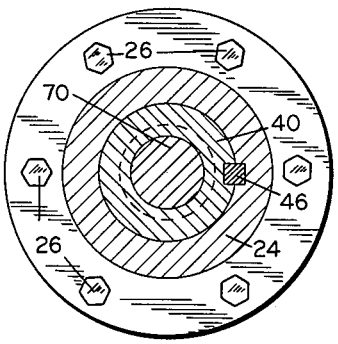
FIG. 4
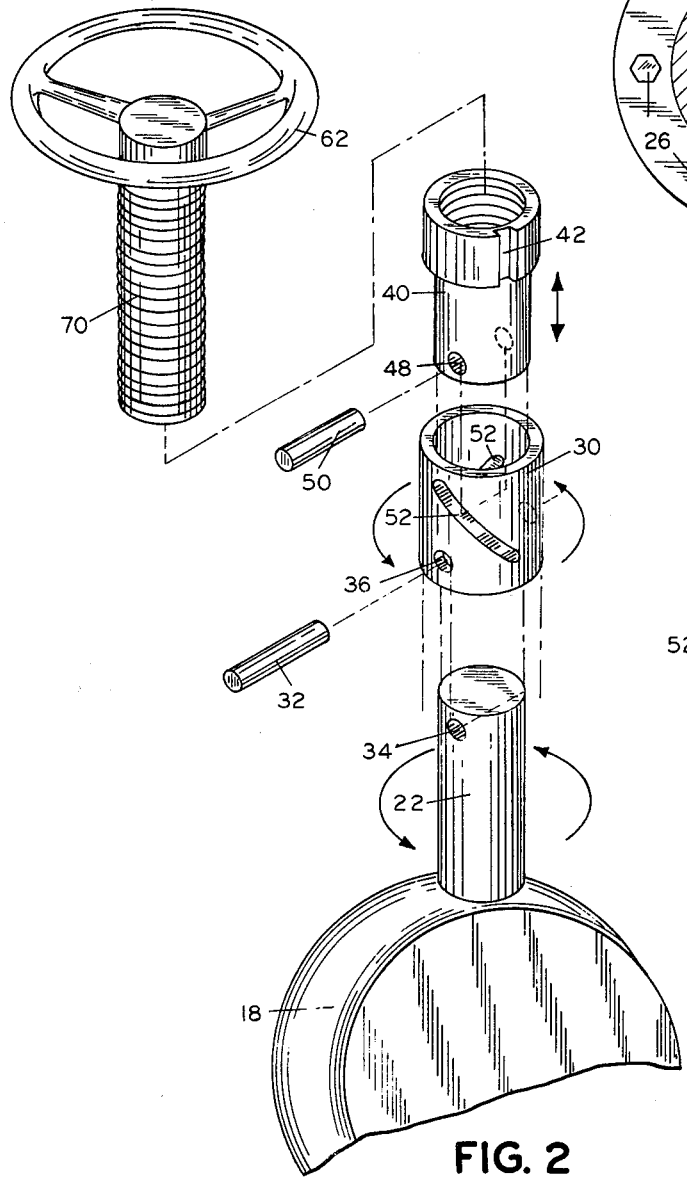
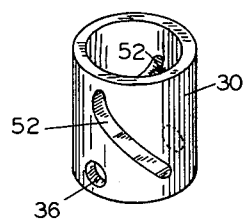
FIG. 7
FIG. 2
INVENTOR.
OTTIS W. KING
BY *Head & Johnson*
ATTORNEYS

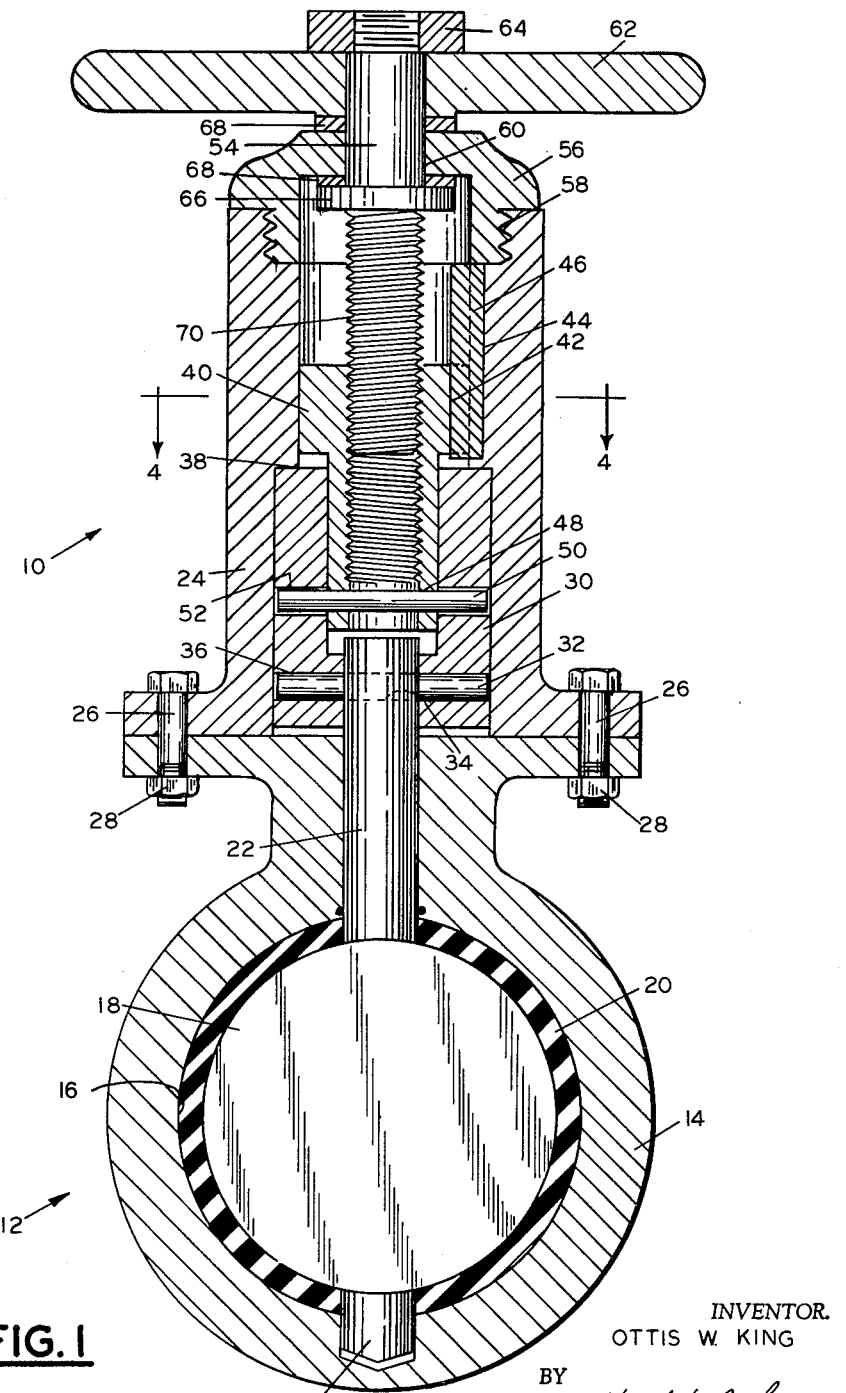

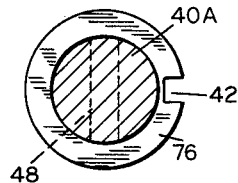
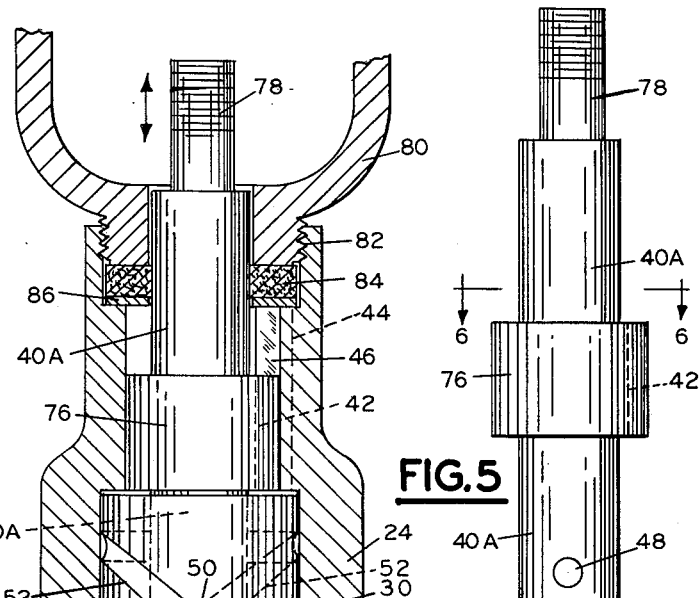
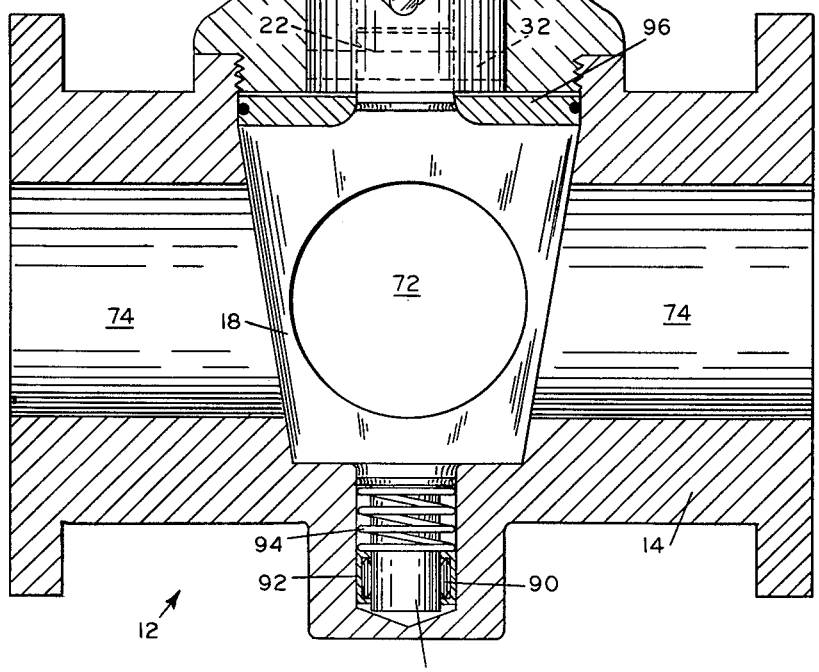
FIG. 6
FIG. 5
FIG. 3
INVENTOR.
OTTIS W. KING
BY Head & Johnson
ATTORNEYS

United States Patent Office 3,184,214
Patented May 18, 1965

3,184,214
CAM OPERATED VALVE
Ottis W. King, 455 S. 80th East Ave., Tulsa, Okla.
Filed Jan. 18, 1962, Ser. No. 167,040
10 Claims. (Cl. 251—229)

This invention relates to a valve operator. More particularly, the invention relates to a novel type of mechanism for rotating the gate member of a valve. In one embodiment the invention relates particularly to a valve actuator for rotating the gate member of a valve, such as is found in the butterfly or plug valve, wherein the gate member is rotated through approximately 90° from full open to full closed position, providing a means for rotating such gate member through such 90° by the rotation of a handwheel wherein the handwheel is rotated through substantially more than 90° to rotate the gate member through such 90°. In another embodiment the invention relates particularly to a valve operator adapting a valve for use with a hydraulic or pneumatic valve actuator wherein the operator converts linear movement from the actuator to rotary movement for rotation of the valve gate member to open or close the valve.

Many types of valves utilized in industry include a gate member which is actuated to open or close a fluid stream port through the body of the valve. Examples of such types of valves include the butterfly valve and the plug valve. In the butterfly type valve a substantially flat disc serves as the gate member. The disc is hinged in the center of the valve on a shaft or stem which extends perpendicular to the axis of the passageway through the body of the valve. The stem is rotated to close the passageway when the disc extends substantially perpendicular to the longitudinal axis of the passageway and to provide passageway through the valve when the disc is rotated approximately 90° so that the disc is parallel to the longitudinal axis of the valve passageway. The most common type of device now used to rotate the disc in a butterfly valve is a lever positioned exterior of the valve. This arrangement is completely satisfactory for smaller type valves which can be manually opened easily by use of a lever and especially when the valves are utilized in an application where they will normally be either full open or full closed. The provision of a lever does not adapt a valve for use as a throttling valve wherein the gate member is stopped at a position somewhere intermediate the full open and full closed position. When a lever is used as the means of controlling the position of the gate member, there is no means of maintaining the valve in a predetermined position. In addition, providing necessary leverage for manually opening and closing a large valve, or a valve which is under high pressure, can be accomplished only by unduly extending the length of the lever handle.

This invention may be defined as a valve operator. More particularly, but not by way of limitation, the invention may be defined as a valve operator for use with a valve having a fluid passageway therethrough and a valve gate member rotatably positioned in said passageway, said gate member adaptable to close said passageway in one angular position relative to said passageway and to open said passageway when rotated to a different angular position, said valve having a stem member to which said gate member is supported and rotated, said valve operator adaptable to rotate said stem member and thereby said valve gate member, said valve operator comprising, in combination: a tubular operator housing supported at one end thereof to said valve, the tubular axis of said housing coincident with the axis of said valve stem member; a tubular coupling member rotatably positioned in said tubular housing in the end thereof adjacent said valve, said coupling member affixed to said stem member whereby the rotation of said coupling member rotates said stem member and thereby said valve gate member, said coupling member having at least one elongated spiraled slot formed in the side thereof; a nut member slideably and non-rotatably supported within said housing, said nut member having a portion thereof telescopically extending within said coupling member; key means affixed to said nut member extending into each of said spiraled slots formed in said coupling member whereby longitudinal movement of said nut member relative to said coupling member rotates said coupling member and thereby said valve gate member; and means of longitudinally positioning said nut member to angularly position said valve gate member.

It is therefore an object of this invention to provide a valve operator for the rotary positioning of a gate member in a valve.

Another object of this invention is to provide a valve operator for the rotary positioning of a gate member of a valve by the rotation of a handwheel wherein a geared or mechanical advantage relationship is provided between the rotation of the handwheel and the rotation of the gate member.

Another object of this invention is to provide a valve operator adaptable to utilize a linearly applied motion to rotate the gate member of a valve.

Another object of this invention is to provide a valve operator for the rotation of the gate member of a valve utilizing a minimum number of components and wherein the valve operator is easy to manufacture and assemble and is economical of construction.

These and other objects and a better understanding of the invention may be had from the following description and claims taken in conjunction with the attached drawings in which:

FIGURE 1 is a cross-sectional view of a butterfly type valve with the operator of this invention affixed to the valve, the cross-sectional view taken perpendicularly to the longitudinal axis of the fluid passageway through the valve.

FIGURE 2 is an exploded view of the primary components of the valve operator of this invention as shown in FIGURE 1.

FIGURE 3 is a cross-sectional view of a plug type valve having the valve operator of this invention affixed thereto adaptable for actuation by a hydraulic or pneumatic operator, the cross-sectional view taken parallel to the longitudinal axis of the fluid passageway through the valve.

FIGURE 4 is a cross-sectional view taken along the line 4—4 of FIGURE 1.

FIGURE 5 is a view of the nut member element of the valve operator of this invention as shown in FIGURE 3.

FIGURE 6 is a cross-sectional view of the nut member taken along the line 6—6 of FIGURE 5.

FIGURE 7 is an isometric view of the coupling member element of the invention showing an alternate arrangement of the spiraled slots adaptable to impart different characteristics to the opening and closing of a valve.

Referring now to the drawings, and first to FIGURE 1, the valve operator of this invention is shown adapted to a typical butterfly type valve. The valve operator is indicated generally by the numeral 10 and the valve is indicated generally by the numeral 12. Valve 12, a typical butterfly type valve, consists of a body 14 through which is formed a cylindrical fluid passage 16. Interposed in the fluid passage 16 is a rotory positioned valve gate member 18. The gate member may include, for efficiency of closure, a resilient seal member 20 supported around the periphery. The gate member 18 is pivotably supported by an axial member or stem 22 by which the gate member 18 is opened and closed. Gate member 18 is shown in the full closed position so that the seal member 20 engages the total internal diameter of fluid passage 16 to prevent flow of fluid through the valve 12. When stem 22 is rotated 90° from the position shown in FIGURE 1, the disc gate member 18 is then parallel relative to the longitudinal axis of fluid passage 16 so that fluid may pass through the valve 12. Thus, the typical butterfly valve 12 is moved from full opened to full closed position by the rotation of stem 22 through approximately 90°.

Stem 22 extends, at one end thereof and in this case the upper end, beyond the body 14 of the valve to provide a means whereby the gate member may be rotated. The typical means of rotating stem 22, and thereby the gate member 18, is by affixing to the exposed portion of the stem 22 a lever (not shown). The valve operator 10 of this invention replaces the lever to perform the function of the rotation of stem 22 to open and close valve 12.

Valve operator 10 consists basically of a tubular operator housing 24 which, by way of example, is flanged and supported to valve body 14 with bolts 26 and nuts 28. Operator housing 24 has a cylindrical internal configuration, the cylindrical axis of the operator housing 24 substantially coinciding with the axis of the valve stem 22. Rotatably supported in the lower portion of operator housing 24 is a tubular coupling member 30. Coupling member 30 receives the valve stem 22 of valve 12 extending beyond the body 14 of the valve. By means of a key 32 positioned in an opening 34 in the valve stem 22 and opening 36 in the coupling member 30, the coupling member 30 and stem 22 are coupled together.

Slideably extending within the upper portion of coupling member 30 in a telescopic relationship is a tubular internally threaded nut member 40. Provided in the exterior surface of the nut member 40 and extending parallel to its longitudinal axis is a keyway 42. In like manner, provided in the interior surface of the operator housing 24 is a matching keyway 44, and inserted in the matched keyways 42 and 44 of nut member 40 and operator housing 24 is a key 46 so that nut member 40 is non-rotatably but slideably supported within operator housing 24.

Near the lower end of nut member 40 an opening 48 is provided receiving a key 50 which extends through spiraled slots 52 formed in the sides of coupling member 30.

Screwably positioned in the threaded interior of nut member 40 is the lower threaded portion of a handwheel stem 54. Affixed to the upper end of operator housing 24 is a top nut 56 which is supported to operator housing 24 by threads 58. Extending through an opening 60 in the top nut 56 is the handwheel stem 54 to which is supported, above the top nut 56, a handwheel 62 held in position by a nut 64. A collar 66, integrally formed as a part of handwheel stem 54, in combination with thrust washers 68, rotatably supports the handwheel stem 54 so that the threaded portion 70 extends coaxially within operator housing 24 to threadably engage nut member 40. Top nut 56, in conjunction with collar 66, thrust washers 68, and handwheel 62, prevents the handwheel stem 54 from moving laterally of the operator housing 24.

Referring to FIGURE 2, the interrelationship of the major components of the valve operator of the invention is best shown. Slots 52 are each spiraled through 90° of the circumference of coupling member 30. Spiral slots 52 are formed diametrically of each other through 90° of the circumference of each side of coupling member 30. Key 50, which extends through slots 52 and through opening 48 in the nut member, always extends perpendicular to the longitudinal axis of the tubular coupling member 30. It can be seen that the operator of the invention would function with only one slot 52 formed in one side of coupling member 30, in which case key 32 would extend to only one side of nut member 40 to enter the single spiraled slot 52. Or, there may be three or more spiraled slots 52 formed around the sides of coupling member 30 with a key 32 extending from nut member 40 into each of the spiraled slots 52. The embodiment shown in FIGURES 1 and 2 wherein two spiraled slots 52 are formed each diametrically of each other and wherein key 32 is a single cylindrical member supported perpendicular to the tubular axis of the coupling member 30 and extending into each of the spiraled slots 52 is deemed the superior arrangement.

The keyway 42 of nut member 40 receives a key 46, as best shown in the cross-sectional view of FIGURE 4, to prevent the rotation of nut member 40 relative to operator housing 24.

Operation of the handwheel embodiment

FIGURE 1 shows valve 12 in closed position. It will be noted that in this position nut member 40 is in its substantially maximum downward position. When it is desired to open gate member 18, handwheel 62 is rotated in the direction to rotate handwheel stem 54 so that threaded portions 70 threadably rotates within the nut member 40, drawing the nut member 40 upwardly. It will be remembered that key 46 prevents nut member 40 from rotating within operator housing 24. Nut member 40 moves upwardly, pulling key 50 with it which moves within slots 52 of coupling member 30. By the spiraled configuration of slots 52, coupling member 30 is caused to rotate. The rotation of coupling member 30 is transferred by key 32 to stem 22, rotating gate member 18 to an opened position.

When handwheel 62 has been rotated a sufficient number of turns, nut member 40 will have been drawn upwardly to its substantial maximum limit, pulling key 50 with it, and by engagement with spiraled slots 52 will have rotated coupling member 30 and thereby gate member 18 approximately 90° from the full closed position to a full opened position.

It can be seen that in either opening or closing the gate member 18 the handwheel 62 may be stopped at any intermediate point so that gate member 18 remains at an attitude intermediate full opened or full closed position. Regardless of the force of fluid flow which may be applied to gate member 18, such force is not sufficient to rotate or otherwise displace handwheel 62 from its seating. This characteristic of the valve operator 10 of this invention makes it possible to readily adapt a valve, such as a butterfly type valve 12, for use as a throttling valve.

Another obvious advantage of the valve operator 10 of this invention is that a great mechanical leverage is obtained between the rotation of handwheel 62 and the rotation of gate member 18 by the component relationship as set forth, and this advantage is achieved in a manner involving the use of a minimum number of parts and requiring a minimum amount of space.

Alternate embodiment

An alternate embodiment of the novel principles of this invention to form a different type valve operator 10 is shown in FIGURE 3. Valve 12 as shown in FIG- URE 3 is a typical plug type valve wherein the gate member 18 has the form of a tapered plug having an opening 72 extending therethrough so that when opening 72 is aligned with the longitudinal axis of the valve body opening 74 the valve is full opened and when, as shown in the attitude of FIGURE 3, opening 72 is perpendicular to the valve body opening 74 the valve is completely closed.

It can be seen that the valve operator 10 of FIGURE 1 may be readily used with the valve of FIGURE 3 or any other type of valve having a gate member 18 which is moved from opened to closed position and vice versa by rotating the valve gate member through approximately 90°.

The valve operator 10 of FIGURE 3 is adaptable for use in conjunction with a valve actuator (not shown), such as a hydraulic or pneumatic actuator. Typically, such valve actuators utilize a diaphragm which is acted upon by pneumatic or hydraulic pressure to cause a linear movement. The valve operator 10 of this invention is adaptable to utilize such linear movement to cause the rotation of a valve gate member 18. In the valve of FIGURE 3, the operator housing 24, coupling member 30, keys 32 and 50, all have functions substantially identical to those previously described with reference to FIGURE 1. Key 32 engages stem 22 of gate member 18 to couple the coupling member 32 to it. In FIGURE 1 nut member 40 is provided with internal threads so that the threading action of threaded portion 70 of handwheel stem 54 transfers a rotary motion of handwheel 62 to a linear motion, whereas the nut member 40A of FIGURE 3 is somewhat different. Nut member 40A of FIGURE 3 is supplied with an integrally formed key portion 76 into which is formed keyway 42 receiving key 46 which is also received by keyway 44 in operator housing 24 so as to support the nut member 40A in a slideable but non-rotatable position within the operator housing 24.

Nut member 40A extends to terminate in an upper threaded portion 78 adapted to be connected for linear actuation by a valve actuator (not shown). A valve actuator support 80 is affixed to operator housing 24, as by threads 82. A gasket means 84, supported by washer 86, seals the nut member 40A, but permits its longitudinal movement.

Nut member 40A, as utilized in the arrangement of FIGURE 3, is best shown in FIGURES 5 and 6.

*Operation of alternate embodiment*

The operation of the valve operator 10 of FIGURE 3 is substantially identical to that as described for FIGURE 1, except that whereas in FIGURE 1 linear motion of nut member 40 is applied by the rotation of handwheel 62, in FIGURE 3 the linear motion of nut member 40A is supplied directly by a pneumatic or hydraulic valve actuator (not shown). When nut member 40A is caused to move upwardly, coupling member 30 and thereby valve gate member 18, is rotated in one direction and when nut member 40A is caused to move downwardly, gate member 18 is rotated in the opposite direction.

The valve operator of this invention has an additional advantage when used with tapered plug type valves as as shown in FIGURE 3. It is noted that the gate member 18 has an integrally formed lower shank portion 88 which is rotatably supported by bearings 90 in a shank receiving opening 92 formed in valve body 14. A spring 94 is compressively positioned between bearings 90 and the gate member 18, urging gate member 18 upwardly.

When downward force is exerted on nut member 40A, gate member 18 is rotated to a closed position and at the same time is completely sealed in its closed position against valve body 14. It will be noted that when key 50 reaches the end of spiraled slots 52, no further rotary action is imparted to the gate member 18 and instead the force downwardly on nut member 40A is transmitted directly as a downward force on gate member 18, seating it firmly in sealed position against the valve body 14. As the valve is opened and the upward movement of nut member 40A first occurs, the downward pressure on gate member 18 is removed and the compressive tension of spring 94 moves the gate member 18 upwardly, unseating it from valve body 14 for free and easy rotation as the nut member 40A continues its upward movement, moving key 50 in spiraled slots 52. Packing 96 helps seal the gate member 18 when it is in its upward, open position, to prevent leakage of fluid or gases from valve body opening 74 into the valve operator 10.

The provision of the valve operator 10 of FIGURE 3, therefore, has an important advantage in that, in combination with the unseating arrangement provided by compressive spring 94, the valve gate member 18 is seated automatically as the valve is moved into closed position and unseated automatically as the valve begins moving towards the opened position.

Spiraled slots 52 formed in coupling member 30 of either the embodiment of FIGURE 1 or FIGURE 3 may be formed of a configuration so that the valve gate member 18 is rotated linearly, that is gate member 18 rotates directly proportionately to the rotation of handwheel 62 in the embodiment of FIGURE 1 or the axial movement of nut member 40A in the embodiment of FIGURE 3, through the full 90° rotation between full opened and full closed position. Or, in an alternate arrangement, spiraled slots 52 may be of a configuration permitting non-linear transmittal of motion from the rotation of handwheel 62 or the linear displacement of nut member 40A to gate member 18.

FIGURE 7 discloses an alternate arrangement of the spiraled slots 52 of coupling member 30 whereby the spiraled slots 52 are arranged for slow opening of the gate member 18. It can be seen that the first or upper portion of the spiraled slots 52 in FIGURE 7 has a smaller angle relative to the axis of coupling member 30 than does the remaining portion of the slots. Thus, for a given longitudinal movement of nut member 40 of FIGURE 1 or 40A of FIGURE 3, there will be a smaller degree of rotation of valve gate member 18 during the first portion of such movement so that a greater mechanical advantage is obtained during the first few degrees of opening or closing of gate member 18. It can be seen that by changing the configuration of the spiraled slots 52 the relationship of the linear movement of nut member 40 or 40A to the rotary movement of the valve gate member 18 may be varied over a wide range.

Although this invention has been described with a certain degree of particularity, it is manifested that many changes may be made in the details of construction and the arrangement of components without departing from the spirit and scope of this disclosure.

What is claimed:

1. A valve having a valve body with a fluid passageway therethrough and a valve gate member rotatably positioned in said passageway, said gate member adaptable to close said passageway in one angular position relative to said passageway and to open said passageway when rotated to a different angular position, a stem member to which said gate member is supported and rotatably connected, an operator arranged to rotate said stem member and thereby said valve gate member, said valve operator comprising, in combination:

a tubular operator housing supported at one end thereof on said valve body with the tubular axis of said housing coincident with the axis of said valve stem member;

a tubular coupling member rotatably positioned in said tubular housing in the end thereof adjacent said valve body, said coupling member affixed to said stem member whereby the rotation of said coupling member rotates said stem member and thereby said valve gate member, said coupling member having at least one elongated spiraled slot formed in the side thereof;

a nut member slideably and non-rotatably supported within said housing, said nut member having a portion thereof telescopically extending within said coupling member and means for longitudinally positioning said nut member; and, key means affixed to said nut member extending into each of said spiraled slots formed in said coupling member whereby longitudinal movement of said nut member relative to said coupling member rotates said coupling member and thereby said valve gate member to angularly position said valve gate member.

2. A valve according to claim 1 wherein said tubular coupling member has a first spiraled slot formed in one side thereof and a second spiraled slot formed in the opposite side thereof, said first and second spiraled slots formed diametric of each other and wherein said key means affixed to said nut member is a single cylindrical key member supported perpendicular to the tubular axis of said coupling member and extending at one end thereof into said first spiraled slot and at the opposite end thereof into said second spiraled slot of said coupling member.

3. A valve having a valve body with a fluid passageway therethrough and a valve gate member rotatably positioned in said passageway, said gate member adaptable to close said passageway in one angular position relative to said passageway and to open said passageway when rotated to a different angular position relative to said passageway, a stem member to which said gate member is supported and rotatably connected, an operator arranged to rotate said stem member and thereby said valve gate member, said valve operator comprising, in combination:

a tubular operator housing supported at one end thereof on said valve body with the tubular axis of said housing coincident with the axis of said valve stem member;

a tubular coupling member rotatably positioned in said tubular housing in the end thereof adjacent said valve body, said coupling member affixed to said stem member whereby the rotation of said coupling member rotates said stem member and thereby said valve gate member, said coupling member having at least one elongated spiraled slot formed in the side thereof;

a tubular nut member slideably supported within said housing, said nut member having a portion thereof telescopically extending within said coupling member, said nut member having threads formed internally thereof;

key means affixed to said nut member extending into each of said spiraled slots formed in said coupling member whereby longitudinal movement of said nut member relative to said coupling member rotates said coupling member;

means for maintaining said nut member slideably and non-rotatably supported in said housing;

and an elongated cylindrical handwheel stem threaded at one end thereof, said threaded handwheel stem rotatably supported by said housing in a fixed longitudinal position, said internally threaded nut member threadably receiving said threaded end of said handwheel stem, and said handwheel stem extending beyond said tubular operator housing whereby said handwheel stem may be rotated to open and close said valve gate member.

4. A valve according to claim 3 wherein said tubular coupling member has a first spiraled slot formed in one side thereof and a second spiraled slot formed in the opposite side thereof, said first and second spiraled slots formed diametric of each other and wherein said key means affixed to said nut member is a single cylindrical key member supported perpendicular to the tubular axis of said coupling member and extending at one end thereof into said first spiraled slot and at the opposite end thereof into said second spiraled slot of said coupling member.

5. A valve according to claim 3 wherein said tubular housing has a keyway slot formed internally thereof in a plane of the tubular axis thereof and wherein said tubular nut member has a mating keyway slot formed in the exterior surface thereof in a plane of the cylindrical axis of said nut member and wherein said means of maintaining said nut member slideably and non-rotatably in said housing includes an elongated, rectangularly cross-sectioned key supported in said mating keyway slots formed in said housing and said nut member.

6. A valve according to claim 3 including a top nut member removably supported to said housing at the end of said housing opposite said end supported to said valve, said top nut member closing said end of said housing, said top nut member having a cylindrical opening therein coaxial with the tubular axis of said housing, said opening rotatably receiving said handwheel stem;

a collar portion of enlarged diameter integrally formed on said handwheel stem, said collar portion in frictional engagement with said top nut member interiorly thereof;

and a handwheel affixed to said handwheel stem, said handwheel in frictional engagement with said top nut member exteriorly thereof, said collar portion, said top nut member and said handwheel cooperating to rotatably support said handwheel stem in said housing in a fixed longitudinal position.

7. A valve having a valve body with a fluid passageway therethrough and a valve gate member rotatably positioned in said passageway, said gate member adaptable to close said passageway in one angular position relative to said passageway and to open said passageway when rotated to a different angular position relative to said passageway, a stem member to which said gate member is supported and rotatably connected, an operator arranged to rotate said stem member and thereby said valve gate member, said valve operator adaptable for use with an externally supported lineal actuator to open and close said valve gate member, said valve operator comprising, in combination;

a tubular operator housing supported at one end thereof on said valve body with the tubular axis of said housing coincident with the axis of said valve stem member;

a tubular coupling member rotatably positioned in said housing in the end thereof adjacent said valve body, said coupling member affixed to said stem member whereby the rotation of said coupling member rotates said stem member and thereby said valve gate member, said coupling member having at least one elongated spiraled slot formed in the side thereof;

an elongated cylindrical nut member slideably supported within said housing, a portion of said nut member extending telescopically within said tubular coupling member and means of maintaining said nut member slidably and non-rotatably supported in said housing, said nut member extending exteriorly of said housing to connect to said linear actuator; and, a key means affixed to said nut member extending into each of said spiraled slots formed in said coupling member whereby longitudinal movement of said nut member relative to said coupling member rotates said coupling member.

8. A valve according to claim 7 wherein said tubular coupling member has a first spiraled slot formed in one side thereof and a second spiraled slot formed in the opposite side thereof, said first and second spiraled slots formed diametric of each other and wherein said key means affixed to said nut member is a single cylindrical key member supported perpendicular to the tubular axis of said coupling member and extending at one end thereof into said first spiraled slot and at the opposite end thereof into said second spiraled slot of said coupling member.

9. A valve according to claim 7 wherein said tubular housing has a keyway slot formed internally thereof in a plane of the tubular axis thereof and wherein said cylindrical nut member has a mating keyway slot formed in the exterior surface thereof in a plane of the cylindrical axis of said nut member and wherein said means of maintaining said nut member slideably and non-rotatably in said housing includes an elongated, rectangularly cross-sectioned key supported in said mating keyway slots formed in said housing and said nut member.

10. A valve according to claim 7 including packing means positioned in said housing in the end thereof opposite said end thereof supported to said valve, said packing means slideably and sealably receiving said nut member.

References Cited by the Examiner
UNITED STATES PATENTS

| | | | |
|---|---|---|---|
| 1,890,524 | 12/32 | Martin | 251—229 X |
| 2,883,144 | 4/59 | Kendig | 251—229 X |
| 2,998,805 | 9/61 | Usab | 74—89 X |
| 3,023,783 | 3/62 | Vickery | 251—315 X |

ISADOR WEIL, *Primary Examiner.*